(12) United States Patent
Kritt et al.

(10) Patent No.: US 9,338,361 B2
(45) Date of Patent: May 10, 2016

(54) VISUALIZING PINPOINT ATTRACTION OBJECTS IN THREE-DIMENSIONAL SPACE

(71) Applicant: LENOVO ENTERPRISE SOLUTIONS (SINGAPORE) PTE. LTD., New Tech Park (SG)

(72) Inventors: Barry A. Kritt, Atlantic Beach, NC (US); Sarbajit K. Rakshit, Kolkata (IN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 92 days.

(21) Appl. No.: 14/307,918

(22) Filed: Jun. 18, 2014

(65) Prior Publication Data
US 2015/0373273 A1   Dec. 24, 2015

(51) Int. Cl.
*H04N 5/235* (2006.01)
*H04N 5/232* (2006.01)

(52) U.S. Cl.
CPC ....... *H04N 5/23293* (2013.01); *H04N 5/23229* (2013.01)

(58) Field of Classification Search
CPC .................. H04N 5/23293; H04N 5/23229
USPC ....................................................... 348/222.1
See application file for complete search history.

(56) References Cited

U.S. PATENT DOCUMENTS

| | | | | |
|---|---|---|---|---|
| 6,459,388 B1 * | 10/2002 | Baron | ........... | G08G 1/0962 340/995.1 |
| 7,805,066 B2 * | 9/2010 | Wexler | ........... | H04N 5/23222 396/429 |
| 8,054,343 B2 * | 11/2011 | Cheatle | ........... | H04N 1/00183 348/14.01 |
| 8,332,429 B2 * | 12/2012 | Poirier | ........... | G06F 17/30241 707/781 |
| 2001/0048815 A1 * | 12/2001 | Nakajima | ........... | G03B 17/24 396/310 |
| 2003/0020816 A1 * | 1/2003 | Hunter | ........... | H04N 1/00323 348/231.3 |
| 2007/0030363 A1 * | 2/2007 | Cheatle | ........... | H04N 1/00183 348/239 |
| 2007/0147826 A1 * | 6/2007 | Matsuzaki | ........... | H04N 5/23293 396/287 |
| 2009/0015702 A1 * | 1/2009 | Garcia Alonso | ... | H04N 5/23293 348/333.02 |
| 2009/0162042 A1 * | 6/2009 | Wexler | ........... | H04N 5/23222 396/49 |
| 2011/0050909 A1 * | 3/2011 | Ellenby | ........... | G03B 17/24 348/207.1 |
| 2011/0093458 A1 | 4/2011 | Zheng et al. | | |
| 2013/0254666 A1 * | 9/2013 | Snavely | ........... | G06F 17/30274 715/731 |
| 2014/0247325 A1 * | 9/2014 | Wu | ........... | H04N 5/23206 348/39 |

OTHER PUBLICATIONS

Disclosed Anonymously, Method and System for Locus of User's Interest Identification Based on Binocular or Other Device Zoom Usage Statistics, IP.com, IPCOM000232507D, Nov. 14, 2013.

* cited by examiner

*Primary Examiner* — Gary C Vieaux
(74) *Attorney, Agent, or Firm* — Kunzler Law Group; Katherine S. Brown

(57) ABSTRACT

A method, system, and computer program product for visualizing pinpoint attraction objects in three dimensional space are provided in the illustrative embodiments. A determination is made that an image includes an object of interest, a first observer observing the object of interest from a first perspective. An observation position is determined from which the image has been captured. A perspective information is computed from the observation position to the object of interest, wherein the perspective information is sufficient to allow a second observer to observe the object of interest from the first perspective. The perspective information is stored, in a repository accessible by a second observer, as tag data associated with the object of interest.

20 Claims, 7 Drawing Sheets

VISUALIZING PINPOINT ATTRACTION OBJECTS IN THREE-DIMENSIONAL SPACE

TECHNICAL FIELD

The present invention relates generally to a method, system, and computer program product for viewing specific objects in a three-dimensional (3D) environment. More particularly, the present invention relates to a method, system, and computer program product for visualizing pinpoint attraction objects in three dimensional space.

BACKGROUND

Many methods are available to see pictures, images, or views, even 3D views of places. For example, a 2D or a 3D map can show a travel plan. The travel plan can include images of the general area of departure, general area of arrival, and areas traversed during the travels.

Some presently available solutions also show buildings and structures that may be present in the area shown on the map. Some presently available technologies, such as Google Earth, allow a user to move and position a stick-figure person onto a view to see the view from the vantage point of the stick-figure person's position. (Google and Google Earth are trademarks owned by Google Inc. in the United States and other countries).

Presently available navigation solutions can guide a user from a present location of the user to a destination location. Some navigation solutions can tune their navigation directions depending upon the user present location, destination location, and mode of transportation.

SUMMARY

The illustrative embodiments provide a method, system, and computer program product for disambiguation of touch-based gestures. An embodiment includes a method for visualizing specific objects. The embodiment determines that an image includes an object of interest, a first observer observing the object of interest from a first perspective. The embodiment determines an observation position from which the image has been captured. The embodiment computes, using a processor and a memory, a perspective information from the observation position to the object of interest, wherein the perspective information is sufficient to allow a second observer to observe the object of interest from the first perspective. The embodiment stores, in a repository accessible by a second observer, the perspective information as tag data associated with the object of interest.

Another embodiment includes a computer usable program product comprising a computer readable storage device including computer usable code for visualizing specific objects. The embodiment further includes computer usable code for determining that an image includes an object of interest, a first observer observing the object of interest from a first perspective. The embodiment further includes computer usable code for determining an observation position from which the image has been captured. The embodiment further includes computer usable code for computing, using a processor and a memory, a perspective information from the observation position to the object of interest, wherein the perspective information is sufficient to allow a second observer to observe the object of interest from the first perspective. The embodiment further includes computer usable code for storing, in a repository accessible by a second observer, the perspective information as tag data associated with the object of interest.

Another embodiment includes a data processing system for visualizing specific objects. The embodiment further includes a storage device including a storage medium, wherein the storage device stores computer usable program code. The embodiment further includes a processor, wherein the processor executes the computer usable program code. The embodiment further includes computer usable code for determining that an image includes an object of interest, a first observer observing the object of interest from a first perspective. The embodiment further includes computer usable code for determining an observation position from which the image has been captured. The embodiment further includes computer usable code for computing, using a processor and a memory, a perspective information from the observation position to the object of interest, wherein the perspective information is sufficient to allow a second observer to observe the object of interest from the first perspective. The embodiment further includes computer usable code for storing, in a repository accessible by a second observer, the perspective information as tag data associated with the object of interest.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
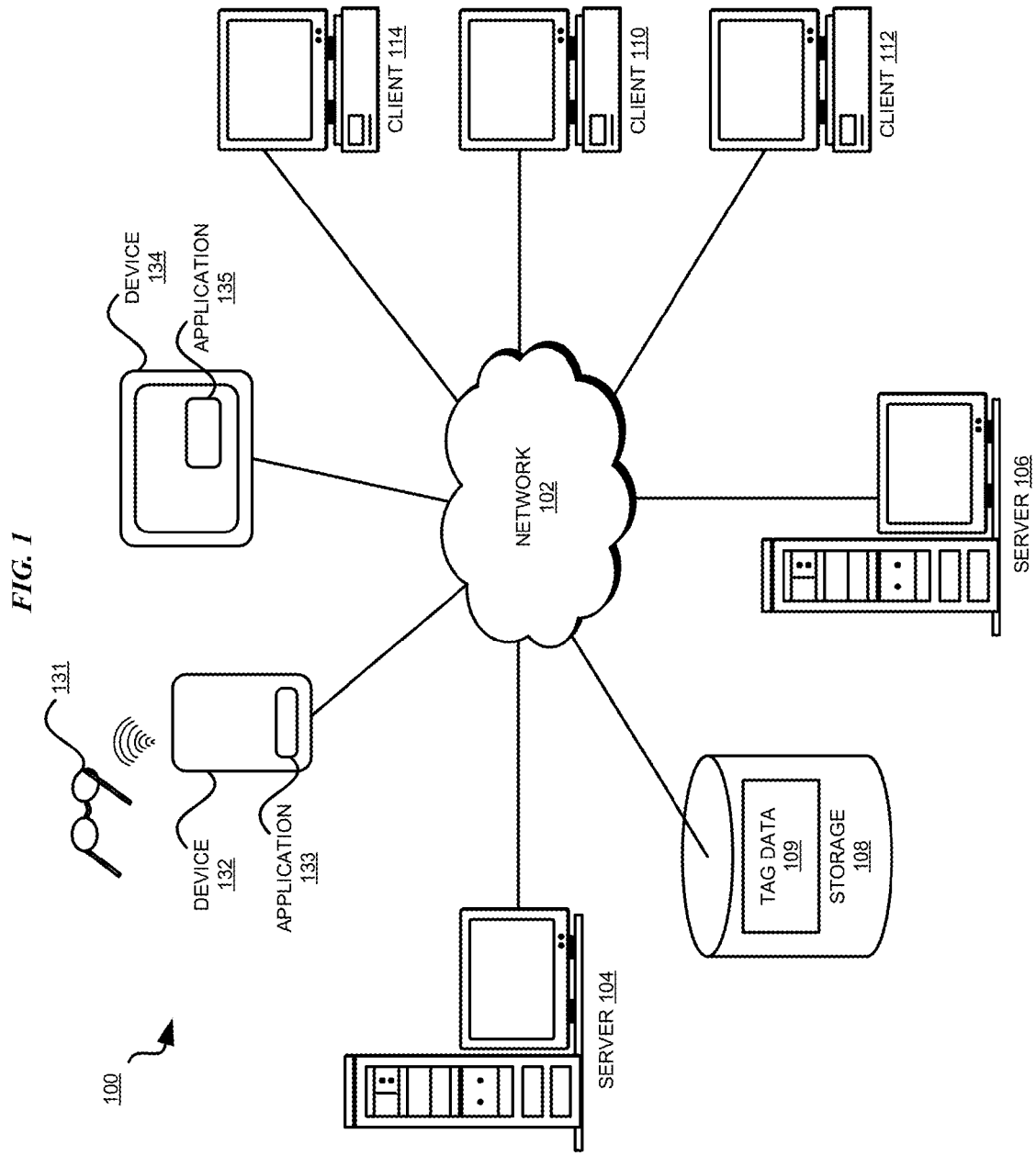
FIG. 1 depicts a block diagram of a network of data processing systems in which illustrative embodiments may be implemented.

The illustrative embodiments recognize that presently-available mapping and navigation technologies are usable for reaching or virtually seeing a place in a big-picture manner. A big-picture view is a view of a geographical area without the details that are of significantly smaller scale than the scale of the geographical area. For example, a big-picture view of a tourist spot includes one or more monuments at a specific place, but omits details such as a particular carving on a particular facade of a particular monument at the tourist spot. Another example of a big-picture view includes a view of a structure but omits a structural detail that can be observed from only a certain vantage point. Another example of a big-picture view includes a view of a site but omits a specific object at the site that is preferably observed from a certain vantage point under certain conditions.

The carving on the facade, the structural detail observable from only certain vantage points, the specific object that can be best viewed from certain preferable positions and under certain conditions are all examples of pinpoint attractions within the scope of the disclosure. A pinpoint attraction is an object that requires a specific vantage point in a given location, orientation of the viewing apparatus at that location, direction of viewing from the location, presence of certain observation conditions or ambient conditions, or a combination thereof, for an observer to sufficiently observe the object. A reference within the disclosure to "an object of interest" is a reference to a pinpoint attraction object.

The illustrative embodiments recognize that even when a brochure or a guidebook shows an image of a pinpoint attraction object, such an image is insufficient to show an observer how to position, orient, and direct the observer's observing apparatus to observe the object. For example, a picture of a painting in a museum guide map does not tell the user that the painting is best observed from approximately fifteen feet away from the painting and from a point approximately ten feet to the right of the center of the painting. Similarly, a picture of an archeological site may show a picture of a carving on a facade of a structure at the site but fails to inform the user that the carving is best observed during late afternoons from approximately fifty feet away from the facade and by orienting the observing apparatus approximately forty five degrees upwards towards the carving.

Furthermore, the static pictures of pinpoint attraction objects that are of interest to observers are published or presented by an entity that controls the pinpoint attraction. For example, the picture of the painting is provided by the museum, the picture of the carving is provided by the archeological society that controls the site, and so on. The illustrative embodiments recognize that often many interesting perspectives of a pinpoint attractions are discovered by other observers. The illustrative embodiments further recognize that presently there is a lack of crowd-sourced information for observing or visualizing pinpoint attractions that exist in 3D space. The illustrative embodiments also recognize that presently there is no effective way for storing and sharing the observational instructions for viewing or visualizing a pinpoint attraction object in 3D space, such that the observational instructions can be created by one or more past observers of the pinpoint attraction object and made available to a future observer of the pinpoint attraction object.

The illustrative embodiments used to describe the invention generally address and solve the above-described problems and other problems related to observing pinpoint attraction objects. The illustrative embodiments provide a method, system, and computer program product for visualizing pinpoint attraction objects in three dimensional space.

An embodiment is implemented in an application executing in a device associated with an observer observing a pinpoint attraction object from a location proximate to the pinpoint attraction object. The embodiment detects an observed image of a pinpoint attraction object. As one aspect of the observation, the embodiment computes a distance from which the pinpoint attraction object is being observed at the time of detecting the observed image. The embodiment further computes other aspects of the observation, e.g., an angle of inclination, an elevation at which the pinpoint attraction object is situated, an actual size of the pinpoint attraction object, a relative size of the pinpoint attraction object in comparison with another object or reference of a known size, the ambient conditions when the pinpoint attraction object is observed, or some combination thereof.

An embodiment captures an image of the pinpoint attraction object from the observer's vantage point (object image). The embodiment further associates with the object image a tag. The tag comprises one or more of the various aspects of the observation of the pinpoint attraction object. The embodiment transmits the object image and the associated tag to a tag data repository.

The observation apparatus according to the illustrative embodiments can be any suitable device that is capable of observing, viewing, or visualizing a 3D environment and rendering an image of a pinpoint attraction object as the pinpoint attraction object exists in the 3D environment. A device usable as an observation apparatus is further capable of receiving and transmitting data.

In one embodiment, an observation apparatus communicates with another device, such as a portable computer or a smartphone, and certain functions of the embodiment are distributed between the observation apparatus and the other device. For example, a head-mounted head-up display (HUD) unit communicates with a mobile computing device, receives data for displaying information on the HUD, and transmits data captured at the HUD. A pair of binoculars or a camera can be similarly equipped to capture data, process data, send data, and receive data as a stand-alone device or in conjunction with another device. An eyewear device, such as electronics-equipped eyeglasses, can be similarly equipped to capture data, process data, send data, and receive data as a stand-alone device or in conjunction with another device.

In one embodiment, the aspects of the observation are computed, the tag is constructed, and there transmission occurs responsive to a tagging input from the observer. In another embodiment, the aspects of the observation may be computed automatically upon pointing the observation apparatus at the pinpoint attraction object, but the tag construction and the transmission occurs responsive to the tagging input.

A tagging input is an input provided by the observer to indicate that the observer is presently making an observation of the pinpoint attraction object, the observer intends to tag the pinpoint attraction object as observed in the present observation, and share the tagged pinpoint attraction object as it presently appears from the observer's perspective. In one embodiment, such as when using a HUD or electronics-enabled eyeglasses, the tagging input can be provided using a movement detectable as a command by such device. For example such a device may be configured to interpret multiple eye-blinks in a defined period as a specific command, e.g., a tagging input. Other ways of providing the tagging input include but are not limited to verbal commands, touch inputs, button press, or a biometric measurement of change therein.

Any number of observers can similarly create tags for a pinpoint attraction object, and store the tags and object images in the tag repository. A future observer at the approximate location from where the pinpoint attraction object is observable uses the stored tag data. For example, the future observer has associated therewith a device capable of rendering the object image and tag data. Particularly, an embodiment in an application executing on the device of the future observer detects the future observer's location. The embodiment sends a request to the tag repository to retrieve any available tag data pertaining to the location. The embodiment receives the tag information.

The embodiment presents a view of the location as observed by the future observer, with an overlay according to the tag data. For example, in one embodiment, the overlay includes visual guide to a position within the location from where a previous observer observed the pinpoint attraction object. The visual guide also includes one or more aspects of the previous observer's observations, e.g., a distance from the pinpoint attraction object and an inclination at which to orient the future observer's observation apparatus, so that the future observer can observe the pinpoint attraction object in a similar manner as the previous observer observed the pinpoint attraction object.

The overlay can include all or some of the tags associated with all or some of the pinpoint attraction objects that may be situated within the location of the future observer. For example, one embodiment selects only those pinpoint attraction objects for the overlay that have at least a threshold number of tags associated therewith from a threshold number of previous observers. As another example, another embodiment presents only those aspects of observing the pinpoint attraction object that are common across the tag data from at least a threshold number of previous observers.

The illustrative embodiments are described with respect to certain devices, objects, observation aspects, overlays, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
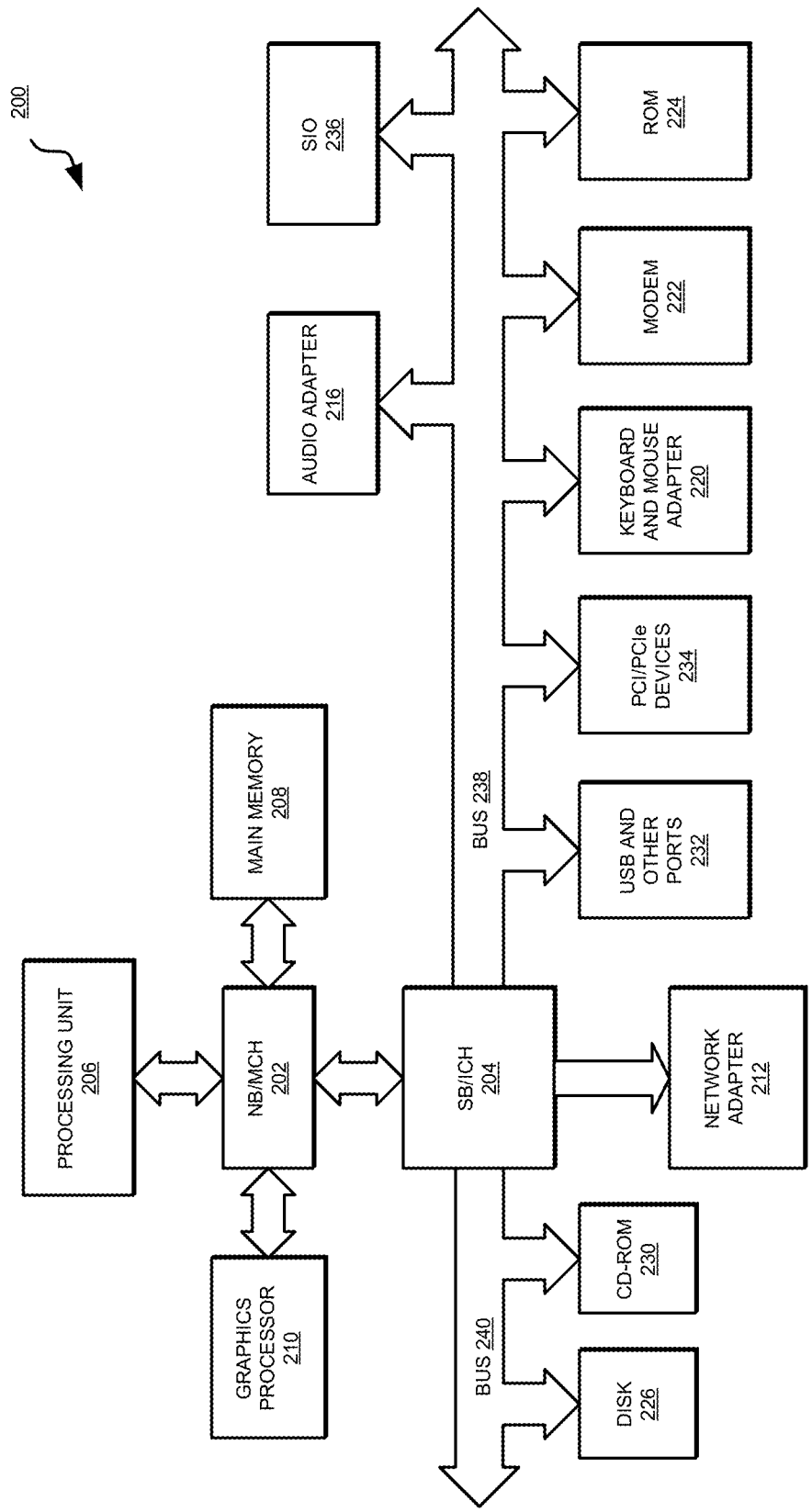
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Device 131 operates in conjunction with device 132 to observe a pinpoint attraction object, construct tag data for the pinpoint attraction object, and share the tag data about the pinpoint attraction object using application 133, which implements an embodiment described herein. In some cases, device 131 can be configured to operate without using device 132, and in such cases device 131 can be configured to execute application 133. Device 134 executes application 135. Application 135 implements an embodiment described herein. Device 134 executes application 135 to use or consume tag data constructed using application 133 and stored as tag data 109 in storage 108. Storage 108 acts as a tag data repository. Device 131 alone or in combination with device 132 forms an observation apparatus. Device 134 forms a presentation apparatus to present guides for observing one or more pinpoint attraction objects according to one or more tag data associated with those pinpoint attraction objects.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of a device, such as any of devices 131, 132, and 134 in FIG. 1 in which computer usable program code or instructions implementing the processes of the illustrative embodiments may be located. Data processing system 200 is described as a computer only as an example, without being limited thereto. Implementations in the form of device 131, or device 132, or device 134 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 133 or application 135 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
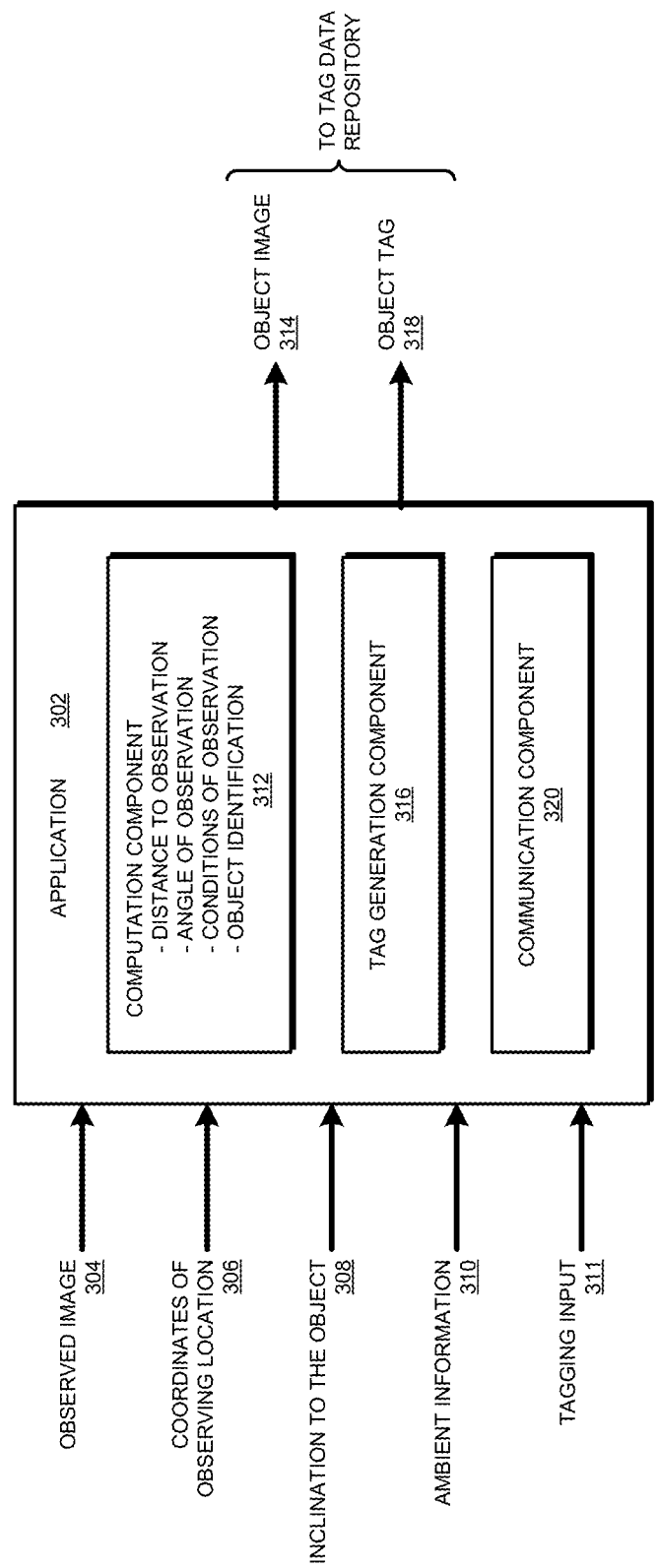
FIG. 3 depicts a block diagram of a configuration for visualizing pinpoint attraction objects in three dimensional space in accordance with an illustrative embodiment.

With reference to FIG. 3, this figure depicts a block diagram of a configuration for visualizing pinpoint attraction objects in three dimensional space in accordance with an illustrative embodiment. Device 302 is an example of device 132 in FIG. 1. Application 302 is an example of application 133 in FIG. 1.

Application 302 receives or detects several types of data as inputs. For example, observed image 304 is a view or visualization of a pinpoint attraction object when an observer has positioned and oriented an observation apparatus towards the pinpoint attraction object.

Coordinates 306 are an example way of determining the observation apparatus' location as positioned and oriented. In one embodiment, coordinates 306 are received from a Global Positioning System (GPS) enabled component associated with the observation apparatus. In another embodiment, coordinates 306 are selected or input by the observer.

Input 308 comprises inclination data. For example, if the observation apparatus has to be tilted upwards to form observed image 304, input 308 comprises an angle of the up-tilt. Generally, the inclination data in input 308 can include data for single axis inclination, two-axes inclination, three-axes inclination. The inclination data of input 308 can also include an absolute height above sea-level (MSL height) or an above ground-level height (AGL height).

Input 310 comprises weather or ambient information. For example, the viewability or visualization of certain pinpoint attraction objects depends upon ambient conditions. For example, an archeological structure may not be sufficiently lit for acceptable viewability at night.

Furthermore, certain historical structures have significance on certain days in the calendar or during certain celestial events and are best viewed when those celestial events are expected to occur. As another example, the Sun aligns with certain pinpoint attraction objects in the Stonehenge complex on certain days highlighting certain pinpoint attraction objects on those days. Such information about weather, calendar, celestial events, ambient conditions and the like comprise input 310.

Tagging input 311 is provided by the observer in the manner described earlier. Note that not all inputs 304-310 are necessary under all circumstances for creating the tag data for a pinpoint attraction object. For example, if the celestial events are not a factor in the visualization of the pinpoint attraction object, input 310 can be omitted without departing the scope of the illustrative embodiments.

Application 302 includes component 312 for performing various computations using the input data. For example, component 312 uses inputs 304 and 306 with some referential information to compute a distance to the pinpoint attraction object (distance of observation). Similarly, component 312 uses input 304, 306, and 308 to compute an angle at which the observation of the pinpoint attraction object is being made (angle of observation). Component 312 selects some, all, or none of the weather or ambient conditions from input 310 as may be indicated by the observer or as may be deduced from input 304 to be relevant to the observation (conditions of observation).

Component 312 further selects the pinpoint attraction object from input 304 (object identification), to which the distance of observation, angle of observation, conditions of observation, and the like pertain. In one embodiment, component 312 extracts, focuses, highlights, or otherwise identifies the pinpoint attraction object in the observed image to form object image 314.

Component 316 generates the tag information for object image 314 in the form of object tag 318. For example, component 316 structures the distance, angle, conditions, and other information computed by component 312 into a predetermined format. For example, tag data repository 108 in FIG. 1 may specify a format with which all tag data should comply. Such formatting makes the tag data usable across a variety of device 134 and across various implementations of application 135 in FIG. 1.

Thus, application 302 produces object image 314 and object tag 318 pertaining to a pinpoint attraction object in observed image of input 304. Communication component 320 sends object image 314 and object tag 318 to a tag data repository, such as tag data repository 108 in FIG. 1.

Figure 4:
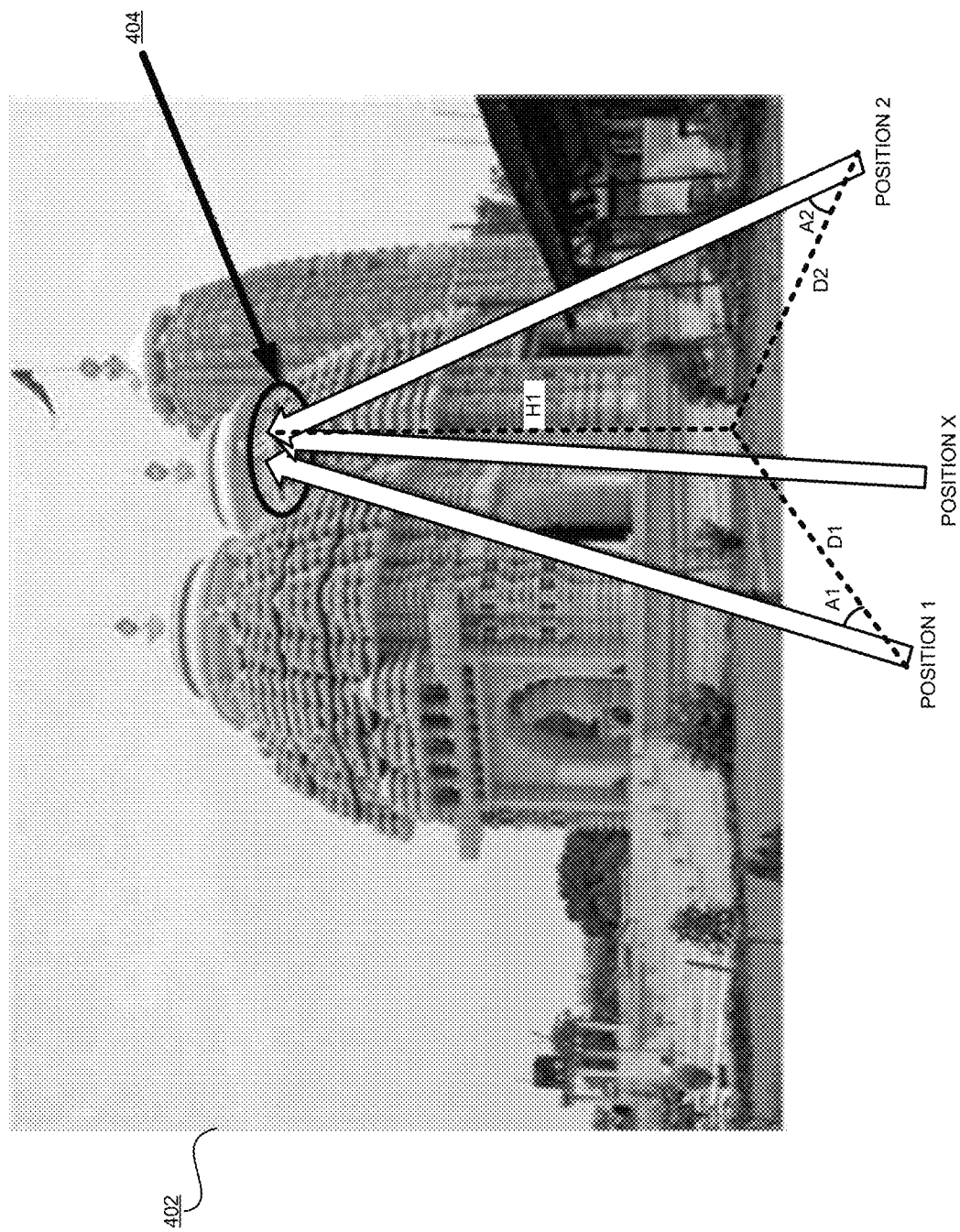
FIG. 4 depicts a pictorial representation of visualizing pinpoint attraction objects in three dimensional space in accordance with an illustrative embodiment.

With reference to FIG. 4, this figure depicts a pictorial representation of visualizing pinpoint attraction objects in three dimensional space in accordance with an illustrative embodiment. Image 402 is an example of input 304 in FIG. 3.

Image 402 depicts an example archeological site with a structure that may be of interest to many observers. Presently available mapping and navigation methods are limited to guiding an observer to the site. Presently available static images from the archeological entity may provide the observer information about the site, the structure depicted therein, and perhaps even include a picture of pinpoint attraction object 404.

In the depicted example, to illustrate an advantage of an embodiment, assume that pinpoint attraction object 404 is the small sculpture visible just below the canopy of the middle structure in image 402. Disadvantageously, none of these presently available methods provides the observer the benefit of the observations made by previous observers.

For example, assume that a previous observer, "observer 1" visualized pinpoint attraction object 404 from "position 1". Observing from position 1, and using an embodiment, such as an implementation of application 302 in FIG. 3, observer 1 contributes a tag, "tag 1" about pinpoint attraction object 404. As an example, tag 1 includes information such as lateral distance D1 from position 1 to pinpoint attraction object 404, above ground elevation H1 of pinpoint attraction object 404, and an angle of inclination A1 at which the observer made the observation of pinpoint attraction object 404 from position 1.

Angle A1 may be ascertained in any suitable manner within the scope of the illustrative embodiments. For example, in one embodiment, a head-mounted viewing device is capable of detecting the observer's pupils and determine where the observer's gaze is focused in the actual view, which is represented in image 402. By measuring the relative locations of the observer's pupils such a device can compute angle A1 and provide to the application implementing an embodiment. In another embodiment, the application can compute angle A1 based on distance D1 and elevation H1.

D1, H1, and A1 are only example ways in which an embodiment can provide perspective information for visualizing pinpoint attraction object 404 from position 1. Many other ways of providing similarly purposed information will become apparent from this disclosure and the same are contemplated within the scope of the illustrative embodiments.

Tag 1 may also include ambient information, e.g., the bright and clear sky conditions depicted in image 402. An embodiment further includes a zoomed-in, cropped, or otherwise extracted portion of image 402, which encompasses pinpoint attraction object 404 as shown, with tag 1.

The same observer or a different observer "observer 2" visualized pinpoint attraction object 404 from "position 2". Observing from position 2, and using an embodiment, such as an implementation of application 302 in FIG. 3, the observer contributes another tag, "tag 2" about pinpoint attraction object 404. As an example, tag 2 includes information such as lateral distance D2 from position 2 to pinpoint attraction object 404, above ground elevation H1 of pinpoint attraction object 404, and an angle of inclination A2 at which the observer made the observation of pinpoint attraction object 404 from position 2. Note that one or more components of tag 2 can be, but need not necessarily be, similar to one or more corresponding components of tag 1. For example, tags 1 and 2 can both include the same above ground elevation H1 if positions 1 and 2 are on the same level but may include different elevations otherwise.

Tag 2 may also include ambient information, e.g., the bright and clear sky conditions depicted in image 402 or different conditions (not shown) if applicable to the day and time of the observation from position 2. Again, an embodiment further includes a zoomed-in, cropped, or otherwise extracted portion of image 402, which encompasses pinpoint attraction object 404 as shown, with tag 2.

Figure 5:
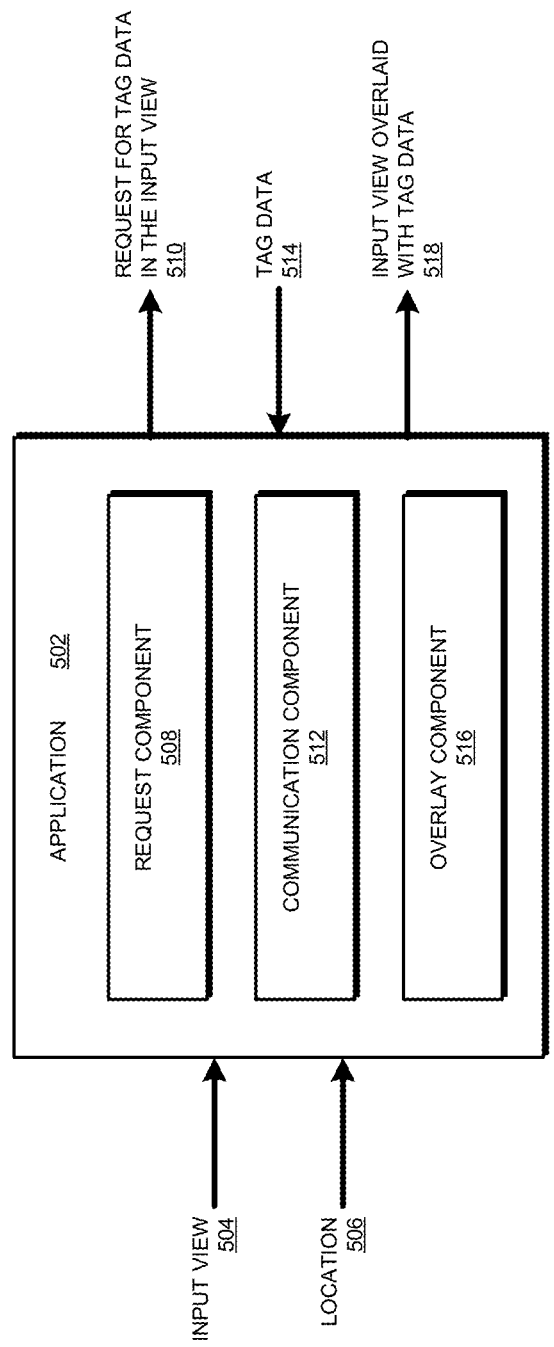
FIG. 5 depicts an application to use the tag information to visualize the pinpoint attraction object in accordance with an illustrative embodiment.

With reference to FIG. 5, this figure depicts an application to use the tag information to visualize the pinpoint attraction object in accordance with an illustrative embodiment. Application 502 is an example of application 135 in FIG. 1. In one embodiment, application 502 and application 302 in FIG. 3 are combined as a common application that is usable for creating tag information about pinpoint attraction objects as well as for using tag information from a repository.

Application 502 receives input view 504. Input view is a view available to a future observer, such as in the form of a static picture of a given site, or in the form of an image captured or generated by device 134 of FIG. 1 when the future observer is present at the site. Only for the purposes of clarity of the description, assume that the site is the same site as represented n image 402 in FIG. 4.

Application 502 further receives location information 506. Location information 506 is sufficient to uniquely identify the site in input view 504, and may be captured, calculated, or obtained in any suitable manner.

Request component 508 in application 502 prepares request 510. Request 510 is a request for any tag data for any pinpoint attraction object that is situated within the bounds of input view 504, and is available in a tag data repository. Communication component 512 sends request 510 to a tag data repository, e.g., repository 108 in FIG. 1, where tag 1 and tag 2 described with respect to FIG. 4 are stored.

Application 502 receives tag data 514. Component 516 generates an overlay for input view 504 using some or all of tag data 514, such as by selecting some or all tags for some or all pinpoint attraction objects in input view 504. For example, assume that tag data 514 comprises tag 1 and tag 2 described with respect to FIG. 4. Using D1, H1, and A1 information from tag 1, component 516 positions the extracted image of pinpoint attraction object 404 associated with tag 1 on input view 502. Component 516 computes suitable proportions, ratios, angles, distances, and other attributes of the overlay such that the various observation aspects in tag 1 are represented on input view 504 according to the dimensions, proportions, and perspective of input view 504. Component 516 produces output 518 comprising the view from input 504 overlaid with information in tag data 514. The future observer using application 502 can thus have the benefit of other observers' perspective of pinpoint attraction objects in view 504.

Figure 6:
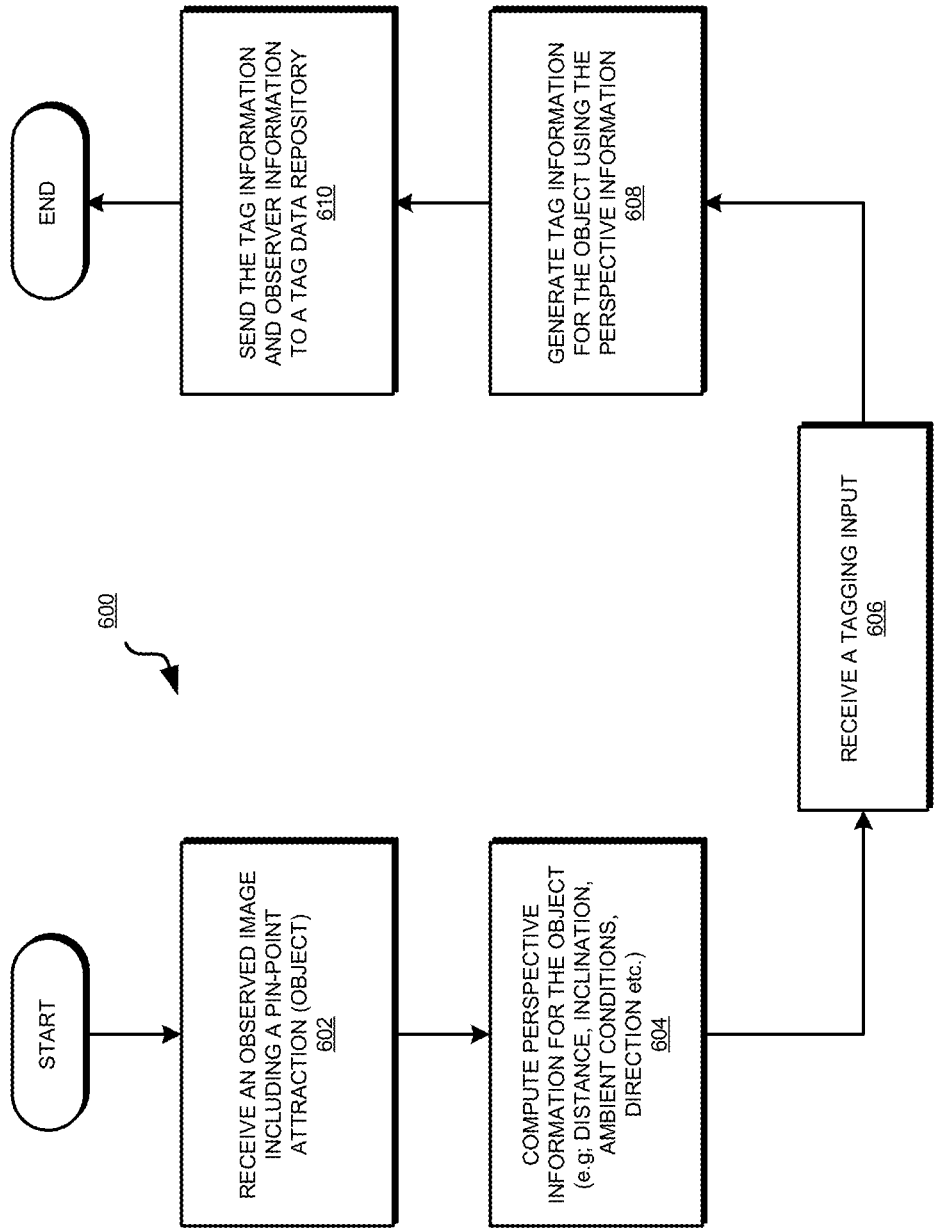
FIG. 6 depicts a flowchart of an example process for visualizing pinpoint attraction objects in three dimensional space in accordance with an illustrative embodiment.

With reference to FIG. 6, this figure depicts a flowchart of an example process for visualizing pinpoint attraction objects in three dimensional space in accordance with an illustrative embodiment. Process 600 can be implemented in application 302 in FIG. 3.

The application receives an observed image, e.g., input 304 in FIG. 3 (block 602). The observed image includes a pinpoint attraction object.

The application computes perspective information for the pinpoint attraction object from the position of observation of the observed image, such as distance, inclination, ambient conditions, direction, and the like to the pinpoint attraction object (block 604). The application receives a tagging input (block 606). The application generates tag information for the pinpoint attraction object using the perspective information computed in block 604 (block 608). The application sends the tag information to a tag data repository (block 610). The application ends process 600 thereafter.

Optionally, the application can also send extracted pinpoint attraction object image to the tag data repository in block 610 as described with respect to FIGS. 3 and 4. Optionally, the application can also send information identifying the observer to the tag data repository in block 610. In one embodiment, the observer information includes information sufficient to identify the observer. In another embodiment, the observer information includes information sufficient to identify the observer, observer's location at the time of the tagging, date and/or time information, and other metadata in a searchable manner.

Observer information may be useful in establishing provenance of the tag data, and some observers' tag data may be more desirable as compared to other observers' tag data when building the overlay described in FIG. 5. For example, tag data from one identified observer may be of better quality than the tag information from another identified observer. As another example, a search across multiple tags can be useful in locating the most recent tag, or tags created during a particular time-window, and so on. The tags can similarly be searched based on other metadata, and such metadata and the related searches are contemplated within the scope of the illustrative embodiments.

Figure 7:
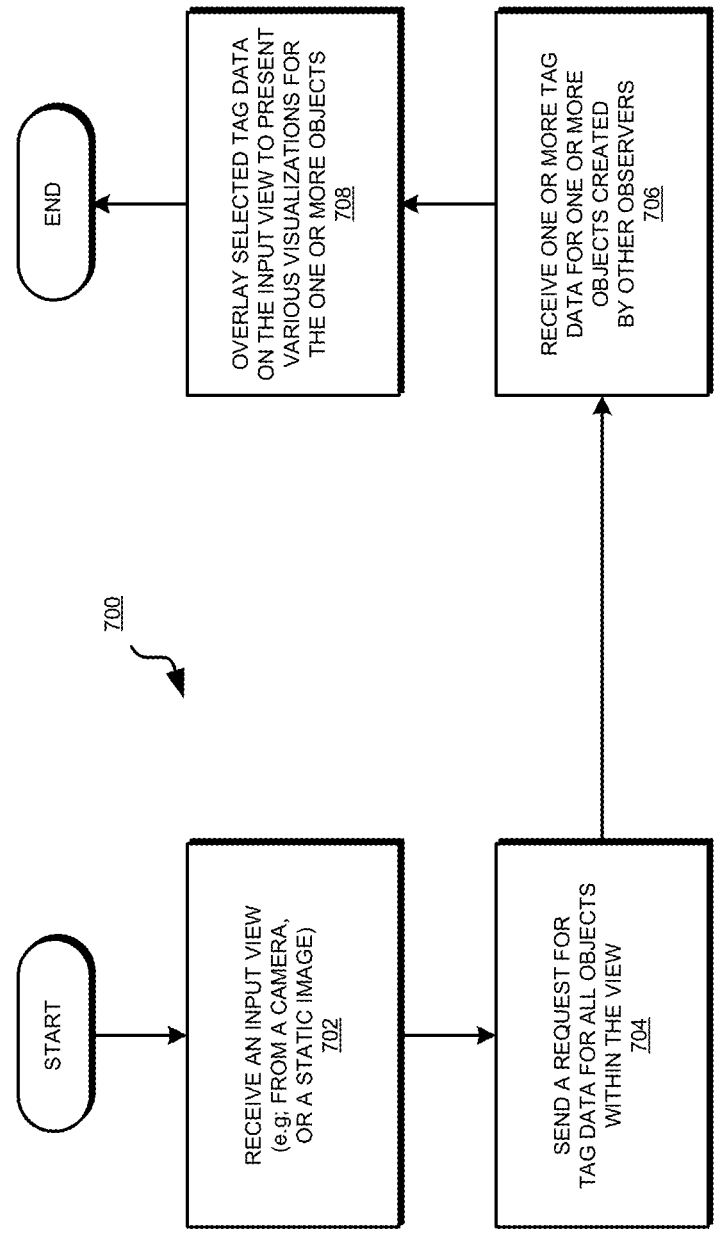
FIG. 7 depicts a flowchart of an example process for using tagged pinpoint attraction object information in accordance with an illustrative embodiment.

With reference to FIG. 7, this figure depicts a flowchart of an example process for using tagged pinpoint attraction object information in accordance with an illustrative embodiment. Process 700 can be implemented in application 502 in FIG. 5.

The application receives an input view, e.g., from a camera, head-mounted device, scope, and the like (block 702). The application sends a request for tag data for the pinpoint attraction objects within the view (block 704).

The application receives one or more tags for one or more pinpoint attraction objects created by other observers (block 706). The application selects some or all of the received tag data and overlays the selected tag data on the input view to present various visualizations for the corresponding one or more pinpoint attraction objects (block 708). The application ends process 700 thereafter.

Thus, a computer implemented method, system or apparatus, and computer program product are provided in the illustrative embodiments for visualizing pinpoint attraction objects in three dimensional space.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for visualizing specific objects, the method comprising:
receiving, using a first application, a first image;
determining that the first image includes an object of interest, a first observer observing the object of interest from a first perspective;
determining an observation position from which the first image has been captured;
receiving inclination data for the first image;
receiving weather information for the first image;
computing, using a processor and a memory, a perspective information from input data, the perspective information enabling a second observer to observe the object of interest from the first perspective, wherein the input data includes the observation position to the object of interest and the inclination data, wherein the perspective information includes a distance to the object of interest and an elevation of the object of interest;
determining whether the weather information is relevant to observation of the object of interest, wherein the perspective information includes a weather condition for observing the object of interest in response to the weather information being relevant to observation of the object of interest;
associating the perspective information with the object of interest; and
storing, in a repository accessible by a second observer, the perspective information as tag data associated with the object of interest.

2. The method of claim 1, further comprising:
receiving, using a second application, a second image, a portion of the second image and a portion of the image representing a site in three-dimensional space, the portion of the image and the portion of the second image representing the site at different times; and
receiving from the repository a set of tag data for a corresponding set of objects of interest, each object of interest in the set of objects of interest being situated in the second image, the set of objects of interest including the object of interest, and the set of tag data including the tag data associated with the object of interest.

3. The method of claim 2, further comprising:
selecting the tag data from the received set of tag data;
modifying a perspective information in the tag data such that a proportion of the object of interest matches a proportion of the second image; and
overlaying the object of interest on the second image according to the modified perspective information; and
forming, responsive to the overlaying, an overlaid second image at the second application, the overlaid second image being usable by the second observer to observe the object of interest from the first perspective.

4. The method of claim 3, wherein the first application and the second application are different instances of an application.

5. The method of claim 3, wherein the selecting the tag data is responsive to the second application having a preference for tag data from the first observer over tag data from a third observer, the tag data from the third observer also being associated with the object of interest and also stored in the repository.

6. The method of claim 2, further comprising:
sending a request for all tag data for all objects of interest situated in the second image.

7. The method of claim 1, further comprising:
storing with the tag data a portion of the image, wherein the portion comprises the object of interest from the first perspective.

8. The method of claim 1, further comprising:
storing with the tag data an identity of the first observer.

9. The method of claim 1, wherein computing the perspective information comprises:
computing a distance from the observation position to the object of interest in a site in three-dimensional space, the site being represented in the image.

10. The method of claim 1, wherein computing the perspective information comprises:
computing an angle of inclination from the observation position to the object of interest in a site in three-dimensional space, the site being represented in the image.

11. The method of claim 10, wherein computing the angle of inclination comprises:
detecting the first observer's pupils;
determining, based on the pupils, a location where the first observer's gaze is focused in the first image; and
determining the angle of inclination based on the location of the first observer's gaze.

12. The method of claim 1, wherein computing the perspective information comprises:
identifying an ambient condition associated with the first perspective, wherein the ambient condition is present at a site in three-dimensional space when the site is represented in the image.

13. The method of claim 1, further comprising:
receiving a tagging input; and
constructing the tag data from the perspective information responsive to the tagging input.

14. The method of claim 1, further comprising:
determining a set of coordinates corresponding to the observation position.

15. The method of claim 1, comprising:
receiving the image, wherein a device captures the image responsive to the observer observing a site in three-dimensional space.

16. A computer usable program product comprising a non-transitory computer readable storage device including computer usable code for visualizing specific objects, the computer usable code comprising:
computer usable code for receiving, using a first application, a first image;
computer usable code for determining that the first image includes an object of interest, a first observer observing the object of interest from a first perspective;
computer usable code for determining an observation position from which the first image has been captured;
computer usable code for receiving inclination data for the first image;
computer usable code for receiving weather information for the first image;
computer usable code for computing, using a processor and a memory, a perspective information from input data, the perspective information enabling a second observer to observe the object of interest from the first perspective, wherein the input data includes the observation position to the object of interest and the inclination data, wherein the perspective information includes a distance to the object of interest and an elevation of the object of interest;
computer usable code for determining whether the weather information is relevant to observation of the object of interest, wherein the perspective information includes a weather condition for observing the object of interest in response to the weather information being relevant to observation of the object of interest;
computer usable code for associating the perspective information with the object of interest; and
computer usable code for storing, in a repository accessible by a second observer, the perspective information as tag data associated with the object of interest.

17. The computer usable program product of claim 16, further comprising:
computer usable code for receiving, using a second application, a second image, a portion of the second image and a portion of the image representing a site in three-dimensional space, the portion of the image and the portion of the second image representing the site at different times; and
computer usable code for receiving from the repository a set of tag data for a corresponding set of objects of interest, each object of interest in the set of objects of interest being situated in the second image, the set of objects of interest including the object of interest, and the set of tag data including the tag data associated with the object of interest.

18. The computer usable program product of claim 16, wherein the computer usable code is stored in a computer readable storage medium in a data processing system, and wherein the computer usable code is transferred over a network from a remote data processing system.

19. The computer usable program product of claim 16, wherein the computer usable code is stored in a computer readable storage medium in a server data processing system, and wherein the computer usable code is downloaded over a network to a remote data processing system for use in a computer readable storage medium associated with the remote data processing system.

20. A data processing system for visualizing specific objects, the data processing system comprising:
- a storage device including a storage medium, wherein the storage device stores computer usable program code; and
- a processor, wherein the processor executes the computer usable program code, and wherein the computer usable program code comprises:
- computer usable code for receiving, using a first application, a first image;
- computer usable code for determining that the first image includes an object of interest, a first observer observing the object of interest from a first perspective;
- computer usable code for determining an observation position from which the first image has been captured;
- computer usable code for receiving inclination data for the first image;
- computer usable code for receiving weather information for the first image;
- computer usable code for computing, using a processor and a memory, a perspective information from input data, the perspective information enabling a second observer to observe the object of interest from the first perspective, wherein the input data includes the observation position to the object of interest and the inclination data, wherein the perspective information includes a distance to the object of interest and an elevation of the object of interest;
- computer usable code for determining whether the weather information is relevant to observation of the object of interest, wherein the perspective information includes a weather condition for observing the object of interest in response to the weather information being relevant to observation of the object of interest;
- computer usable code for associating the perspective information with the object of interest; and
- computer usable code for storing, in a repository accessible by a second observer, the perspective information as tag data associated with the object of interest.

* * * * *